United States Patent [19]

Dernedde

[11] 4,386,780

[45] Jun. 7, 1983

[54] APPARATUS FOR CLEANING LIQUIDS IN CENTRIFUGAL PUMPS OR THE LIKE

[75] Inventor: Robert Dernedde, Frankenthal, Fed. Rep. of Germany

[73] Assignee: Klein, Schanzlin & Becker Aktiengesellschaft, Frankenthal, Fed. Rep. of Germany

[21] Appl. No.: 274,675

[22] Filed: Jun. 17, 1981

[30] Foreign Application Priority Data

Jul. 12, 1980 [DE] Fed. Rep. of Germany ....... 3026541

[51] Int. Cl.$^{3}$ ............................................ F16J 15/00

[52] U.S. Cl. ...................................... 277/15; 277/23; 277/24; 277/67; 277/123; 277/134; 415/169 A; 415/170 B

[58] Field of Search .................. 415/168, 169, 169 A, 415/110, 111, 112, 170 B, 121 A; 277/15, 24, 134, 67, 23

[56] References Cited

U.S. PATENT DOCUMENTS

| | | | |
|---|---|---|---|
| 1,570,285 | 1/1926 | Schleyer | 415/111 |
| 2,276,824 | 3/1942 | Carruthers | 415/121 |
| 2,936,715 | 5/1960 | Southam et al. | 415/169 A |
| 3,459,430 | 8/1969 | Ball | 415/169 A |
| 3,601,307 | 8/1971 | Shapiro | 415/169 A |
| 3,843,140 | 10/1974 | Mayer et al. | 415/110 |
| 3,881,840 | 5/1975 | Bunjes | 415/111 |
| 4,249,860 | 2/1981 | Erickson | 415/111 |
| 4,269,566 | 5/1981 | Spruiell | 415/170 B |
| 4,335,886 | 6/1982 | Frey et al. | 415/111 |

FOREIGN PATENT DOCUMENTS

| | | | |
|---|---|---|---|
| 466912 | 8/1950 | Canada | 415/170 B |

*Primary Examiner*—Robert W. Jenkins
*Assistant Examiner*—Thomas W. Epting
*Attorney, Agent, or Firm*—Kontler, Grimes & Battersby

[57] ABSTRACT

An apparatus which removes contaminants from the liquid in a centrifugal pump has a housing connected with the pump shaft and having a cleaning chamber connected with a first space containing contaminated liquid and a second chamber connected with a second space for cleaned liquid as well as with the first chamber. The second space communicates with the first space by way of a narrow clearance which further communicates with an outlet of the first chamber. The first chamber can contain a disc separator and its outlet is positioned in such a way that, when the housing rotates, liquid entering the first chamber from the first space is relieved of impurities and flows into the second chamber where it can undergo additional cleaning prior to entering the second space. The contaminants return into the first space via outlet and the clearance, and those contaminants which are contained in the liquid entering the second space are returned into the first space by way of the aforementioned clearance. The liquid is circulated in response to rotation of the housing, either exclusively as a result of establishment of a pressure differential between the two spaces and/or by the provision of one or more conveyors in the form of threads, ribs, discs, scoops or impellers.

15 Claims, 5 Drawing Figures

APPARATUS FOR CLEANING LIQUIDS IN CENTRIFUGAL PUMPS OR THE LIKE

BACKGROUND OF THE INVENTION

The present invention relates to improvements in apparatus for removing contaminants, such as sludge, from fluids which are circulated in centrifugal pumps, turbines and like fluid flow machines wherein solid contaminants must be kept away from contact with one or more sensitive components including bearings, seals and the like. More particularly, the invention relates to improvements in apparatus which can be installed in centrifugal pumps, turbines or like machines in regions between first and second spaces respectively containing contaminated and purified fluids to ensure that the second space receives a fluid (primarily liquid) which is devoid of any contaminants or wherein the percentage of contaminants is reduced to an acceptable value.

Many machines which convey one or more streams of a contaminated fluid (hereinafter, the fluid will be referred to as liquid) must be provided with means for intercepting at least a certain percentage of solid contaminants upstream of certain sensitive components which are likely to be damaged or destroyed by solid impurities. Typical examples of such machines are sludge pumps whose purpose is to convey a contaminated liquid but which do contain several parts that must be shielded from some or all of the impurities in spite of the fact that they necessarily come in contact with the conveyed liquid. Heretofore known cleaning or separating apparatus include those which are provided with deflectors serving to cause the impurities to bypass the bearings, seals and analogous sensitive parts. In many instances, such deflectors rely on the action of centrifugal force, on the establishment of meandering paths for the flow of contaminated liquid and/or on similar expedients. Care must be exercised to ensure that stoppage of the machine will not result in settling of floating heavier impurities or rise of lightweight contaminants and possible accumulation of settled or risen impurities in regions from which the impurities will or are likely to reach the sensitive parts on resumption of operation of the machine, i.e., intermittent operation of the machine should not entail relatively large accumulations of impurities in the space or spaces which lead to bearings, seals or the like.

Heretofore known cleaning or separating apparatus of the above outlined character are not entirely satisfactory for a variety of applications. Therefore, the cleaning action of such apparatus is often implemented by addition of clean liquid which has been relieved of impurities at a locus remote from the machine or which was never contaminated. The clean liquid can constitute a sealing liquid (also called injection medium) which is conveyed from the outside and is used in or in connection with many types of seals for pumps or the like. Alternatively, the liquid which flows toward the sensitive part or parts of a pump, turbine or a like fluid flow machine can be caused to pass through one or more filters, for example, under the influence of the normally existing pressure differentials in such types of machines. If the pressure differential which develops when the machine is in use does not suffice, the machine can be equipped with auxiliary circulating means which causes or cause the liquid (or a portion of the liquid) to pass through one or more filters while on the way into contact with sensitive components of the machine or while flowing through a bypass whose outlet leads into the chamber for non-contaminated liquid. Such methods have met with reasonable success but the apparatus for the practice thereof exhibit a number of serious drawbacks which prevent them from finding application in a number of machines. Thus, if the filter or filters are installed in the interior of the machine, contaminated liquid (i.e., liquid which is still laden with lightweight and/or relatively heavy impurities) must be permitted to enter the pump proper. This can result in deposition and accumulation of prematurely separated contaminants in the path which leads into the filtering unit. Moreover, the contaminants are likely to be recirculated more than once with attendant wear upon the parts which come in repeated contact therewith prior to final or actual removal of intercepted impurities from the machine.

As a rule, the space which contains the contaminated liquid cannot be completely segregated from the space for reception and storage of cleaned liquid. Thus, at least some leakage will take place in highly reliable seals and such leakage is likely to lead to admission of a certain amount of impurities into the space for clean liquid. Moreover, while the two spaces might be practically completely sealed from each other in normal operation of the machine, pronounced deviations of pressure from anticipated pressure and the resulting more pronounced pressure differentials are likely to entail the admission of higher percentages of contaminants into the space which is supposed to contain clean liquid. For example, the consumer of pressurized liquid which is connected to the outlet of a centrifugal pump is likely to influence the pressure differential in the interior of the pump to such an extent that contaminants tend to penetrate into the region of seals, bearings or the like when the operation of the consumer entails a pronounced rise of pressure in the space for contaminated liquid and/or pronounced fluctuations of the rate of liquid flow between the two spaces.

A further drawback of conventional cleaning or separating apparatus is that removal of friction heat from the space for clean liquid often necessitates vigorous circulation of cleaned liquid therein. Also, an effective filter or system of filters is often very bulky so that it cannot be readily installed in many types of existing fluid flow machines. On the other hand, filters are likely to offer high resistance to the flow of liquid therethrough so that the apparatus must be equipped with powerful liquid circulating means which consume large quantities of energy. If the resistance of the filter or filters is high, the apparatus must be equipped with means for removing the developing heat or for cooling the cleaned liquid prior to permitting it to flow into contact with bearings, seals or the like.

OBJECTS AND SUMMARY OF THE INVENTION

An object of the invention is to provide a novel and improved apparatus which can effectively clean liquids in centrifugal pumps, turbines and analogous fluid flow machines in a small area and without the consumption of excessive quantities of energy, and which can be readily installed in or combined with many types of existing fluid flow machines.

Another object of the invention is to provide a cleaning apparatus of the above outlined character which can be used with advantage for removal of relatively heavy or lightweight impurities, which automatically leads segregated impurities away from the region or regions which must be shielded from contaminants, and which can operate satisfactorily without resort to power-operated auxiliary liquid circulating means.

A further object of the invention is to provide the cleaning apparatus with novel and improved means for controlling the flow of liquid therethrough in the regions upstream as well as downstream of the intercepting station or stations, and which can be designed to effect a highly reliable or practically complete segregation of any and all impurities of the nature that could affect the integrity of certain sensitive parts in the fluid flow machine.

An additional object of the invention is to provide the apparatus which novel and improved means for partially recirculating the already cleaned liquid through the cleaning station or stations so as to further reduce the likelihood of penetration of impurities into contact with sensitive parts of the machine.

Another object of the invention is to provide a fluid flow machine, especially a centrifugal pump or turbine, which embodies a cleaning or separating apparatus of the above outlined character.

The invention is embodied in a cleaning or separating apparatus which is installed or incorporated in a fluid flow machine (such as a centrifugal pump or turbine) wherein contaminated liquid is conveyed from a first space toward a second space and the contaminants must be removed upstream of the second space because the latter can serve or serves to admit liquid directly to one or more sensitive parts of the machine. The cleaning apparatus comprises a housing which is disposed between the first and second spaces and has communicating first and second chamber means, inlet means for admission of contaminated liquid from the first space into the first chamber means, first outlet means connecting the second space with the second chamber means and second outlet means connecting the first chamber means with the first space. The apparatus further comprises means (e.g., the shaft of a centrifugal pump) for rotating the housing. The second outlet means is positioned to discharge into the first space contaminants which are separated from the liquid entering the first chamber means by way of the inlet means and migrate toward the second outlet means as the liquid in the first chamber means is set in rotary motion. The housing is provided with channel means connecting the first and second chambers so that the purified or partly purified liquid can enter the second chamber means where it can undergo additional cleaning prior to admission into the second space. As a rule, the liquid in the fluid flow machine embodying the improved apparatus exhibits the tendency to flow from the first space into the first chamber means when the machine is in operation; this effects or contributes to circulation of liquid in and through the cleaning apparatus which preferably further comprises means defining a path (e.g., a narrow clearance) for the flow of some cleaned liquid from the second chamber means and/or from the second space into the first space. In addition to the aforementioned tendency of liquid to flow into the first chamber means when the machine is in operation, the apparatus may comprise one or more conveyor means (e.g., in the form of threads, ribs, panels, partitions, inserts, scoops, auxiliary impeller means or the like) for effecting circulation of liquid from at least one of the chamber means into the first space, e.g., from the first chamber means via the aforementioned path and into the first space as well as from the second chamber means, into the second space and from the second space into the first space by way of the aforementioned path.

The apparatus can further comprise a set of annular dished inserts or analogous means for subdividing the first chamber means into a plurality of passages extending from the inlet means toward the channel means for the flow of cleaned liquid into the second chamber means. The inlet means is or can be located radially outwardly of the channel means so that the liquid which enters the first chamber means and flows into the second chamber means flows toward the axis of rotation of the housing. The conveyor means which assists or promotes circulation of liquid through the cleaning apparatus may comprise one or more sets of threads in the aforementioned path and/or one or more discs and protuberances on the discs, such discs being disposed in the one and/or the other chamber means. The circulation of liquid can be promoted still further by placing the inlet means nearer to the axis of rotation of the housing than at least one of the outlet means.

The second chamber means may form part of the second space.

The novel features which are considered as characteristic of the invention are set forth in particular in the appended claims. The improved cleaning apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
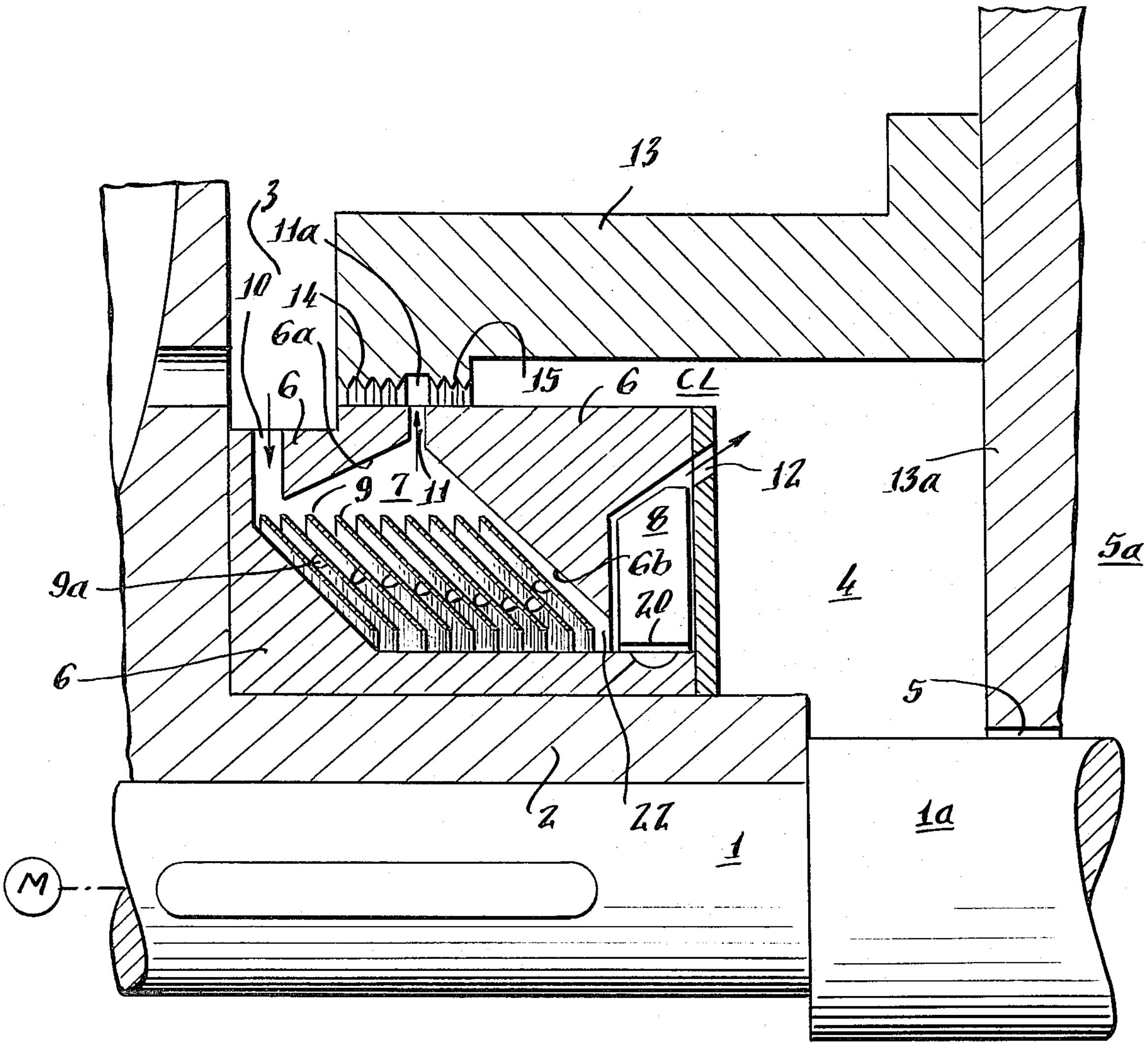
FIG. 1 is a fragmentary axial sectional view of a fluid flow machine and of a cleaning apparatus which embodies one form of the present invention.

The fluid flow machine of FIG. 1 is or is assumed to constitute a centrifugal pump having a shaft 1 driven by a motor M. The shaft 1 is surrounded by and rotates with a sleeve-like hub 2 constituting a carrier for a rotary cleaning apparatus which includes a housing 6 sharing all angular movements of the shaft. The stationary casing or body of the pump comprises a cylindrical member 13 and an annular member 13*a*. The latter defines with an enlarged portion 1*a* of the shaft 1 an annular clearance or gap 5 which should be free of contaminants, i.e., the liquid (such as sludge) which is circulated by the pump should not reach the gap 5. The parts 2, 6 and 13 define a first space 3 which is filled with contaminated liquid, and the parts 1, 2, 6, 13, 13*a* define a second space 4 which communicates with the gap 5 and is filled with cleaned or decontaminated liquid.

The housing 6 of the cleaning apparatus defines an annular cleaning or segregating chamber 7 and an annular buffer chamber 8 which communicates with the chamber 7 by way of one or more channels 22 machined into the material of the housing 6. The chamber 7 contains a package of dished annular inserts 9 provided with protuberances 9*a* or other suitable distancing elements so as to ensure that the neighboring inserts 9 define passages wherein the liquid to be cleaned can flow radially inwardly and toward the channel or channels 22 for admission into the buffer chamber 8. The reference character 10 denotes an inlet which is provided in the housing 6 and establishes communication between the chamber 7 and space 3. Thus, the inlet 10 allows contaminated liquid to flow from the space 3 and into the interior of the chamber 7 wherein the liquid is compelled to flow between the neighboring inserts 9 and into the channel or channels 22. Since the housing 6 rotates, heavier impurities which enter the chamber 7 are subjected to the action of centrifugal force which causes such impurities to leave the chamber 7 by way of an outlet 11 discharging into a cylindrical clearance CL between the peripheral surface of the rotating housing 6 and the internal surface of the stationary cylindrical member 13. The clearance CL allows some liquid to flow between the spaces 3 and 4. The outlet 11 of the chamber 7 is disposed in the region of two conveyors 14, 15 in the form of internal screw threads on the cylindrical member 13. The orientation of threads on the conveyors 14 and 15 is such that, when the housing 6 rotates, liquid tends to flow in a direction to the left, as viewed in FIG. 1, i.e., from the space 4 and outlet 11 into the clearance CL and thence into the space 3.

The surface bounding the radially outermost portion of the chamber 7 includes two substantially frustoconical sections 6*a* and 6*b* whose bases flank the outlet 11 to thereby promote the evacuation of heavier impurities from the chamber 7 and into the clearance CL. The clearance CL is relatively narrow so that the parts 6 and 13 constitute a flow restrictor which opposes unimpeded flow of liquid from the space 4 into the space 3. Actually, the clearance CL can be said to constitute a sealing gap. The outermost portion of the outlet 11 is disposed between the conveyors 14 and 15 which ensure adequate circulation of liquid for the purpose of segregating all impurities from the liquid which is permitted to enter the space 4 and/or gap 5. The buffer chamber 8 has an inclined outlet 12 which discharges cleaned liquid into the radially outermost portion of the space 4 in such a way that the impurities (if any) leaving the chamber 8 are caused to advance toward the internal surface of the stationary cylindrical member 13. Each of the conveyors 14, 15 may have a single thread or a multiple thread.

The buffer chamber 8 contains a set of plate-like baffles 20 which constitute auxiliary conveyor means for causing the admitted liquid to flow in a direction toward the outlet 12, i.e., for causing the liquid that enters via channel or channels 22 to flow radially outwardly and to leave the chamber 8 for entry into the outer portion of the space 4.

The aforementioned conveyors and auxiliary conveyor means merely contribute to circulation of liquid for the purpose of segregating the impurities therefrom. The major part of circulating action is normally supplied by the pressure differential which develops in a centrifugal pump when the latter is in use and causes liquid to flow from the space 3, into the chamber 7 via inlet 10, thence through the outlet 11 as well as through the channel or channels 22, through the outlet 12 and into the space 4. In fact, the just discussed pressure differential often suffices so that the conveyor means 14, 15 and/or 20 can be dispensed with.

The operation is as follows:

When the motor M is on to drive the pump shaft 1, the hub 2 transmits torque to the housing 6 which rotates with reference to the stationary cylindrical member 13, i.e., with reference to the internal threads of the conveyors 14 and 15. These threads convey liquid from the chamber 8 via outlet 11 and into the space 3, and they also cause some liquid to flow from the chamber 8, via outlet 12, outermost portion of the space 4, clearance CL and back into the space 3. Thus, liquid in the space 3 is subjected to a very pronounced agitating action which is effected by the conveyor means and the resulting flow of liquid and contaminants from the clearance CL in a direction to the left and beyond the threads 14. The liquid which is withdrawn from the clearance CL and flows back into the space 3 is replaced with contaminated liquid flowing from the space 3 into the chamber 7 via inlet 10. The liquid which enters the chamber 7 begins to circulate at the RPM of the housing 6 and shaft 1 whereby the larger and heavier impurities travel toward the surface sections 6*a*, 6*b* and therealong into the annular compartment 11*a* between the threads 14 and 15. Smaller and/or lightweight impurities penetrate into the passages between the inserts 9 and are intercepted thereby so that the liquid which enters the channel or channels 22 and flows into the buffer chamber 8 is at least substantially free of impurities. This will be readily appreciated by taking into consideration the relatively short sedimentation paths for impurities which enter the passages between the dished inserts 9. The smaller or lighter impurities which are intercepted by the inserts 9 travel along the respective sides or surfaces of such inserts toward the surface sections 6*a*, 6*b* and leave the chamber 7 via outlet 11. Such particles travel in a direction counter to the flow of liquid from the inlet 10 toward the channel or channels 22 wherein the liquid flows at an average or median speed. The lighter and/or smaller impurities which migrate radially outwardly in the passages between the inserts 9 are separated from the inserts as soon as they reach the radially outermost portions of the parts 9 to be thereupon propelled across the radially outermost portion of the chamber 7 and into the outlet 11, either directly or subsequent to impingement upon and sliding movement along the sections 6*a* and 6*b* of the surface bounding the outermost part of chamber 7. Such mode of segregating impurities is somewhat similar to that known from the field of so-called disc separators and has been found to be quite effective.

As mentioned above, the impurities which are segregated from the liquid flowing through the chamber 7 leave this chamber via outlet 11. Such impurities are entrained by the thread or threads of the conveyor 14 and are returned into the space 3. On the other hand, clean or cleaned liquid which has advanced radially inwardly by flowing through the passages between the inserts 9 enters the channel or channels 22 and flows into the buffer chamber 8. After traversing the chamber 8, the cleaned liquid leaves via outlet 12 and enters the radially outermost portion of the space 4 for clean or cleaned liquid. If the liquid which enters the buffer chamber 8 still contains a certain percentage of impurities, such impurities are caused to leave the chamber 8 via outlet 12 and to migrate toward the internal surface of the cylindrical member 13 where the conveyor 15 induces a flow toward and into the clearance CL so that such impurities leave the space 4 without ever approaching the gap 5. A natural flow of liquid from the radially outermost portion of the space 4 into the space 3 takes place when the pump is in use if the rate at which the inlet 10 admits contaminated liquid into the chamber 7 exceeds the rate of outflow of cleaned liquid via gap 5. Under such circumstances, a certain amount of liquid flows from the chamber 7 and directly into the clearance CL, and a certain amount of liquid enters the clearance CL by flowing through the chamber 7, channel or channels 22, chamber 8, outlet 12 and the outermost portion of the space 4. As a rule, the rate of outflow of cleaned liquid via gap 5 is small or negligible. However, the volume of the space 5*a* to the right of the gap 5 is preferably selected in such a way that it can accept a larger quantity of cleaned liquid if the pressure of liquid flowing through the inlet 10 and into the cleaning chamber 7 increases, i.e., when the rate of liquid flow from the space 4 into the space 5*a* increases at least slightly or even well above the average rate. This necessitates the provision of effective measures for prevention of penetration of contaminated liquid into the gap 5. In addition to the previously discussed features of the cleaning apparatus, these measures include such dimensioning of the buffer chamber 8 and space 4 that the chamber 8 and space 4 can accumulate a certain percentage of impurities (when the rate of flow of impurities into the buffer chamber 8 is relatively high) without permitting any impurities to reach the gap 5.

Figure 2:
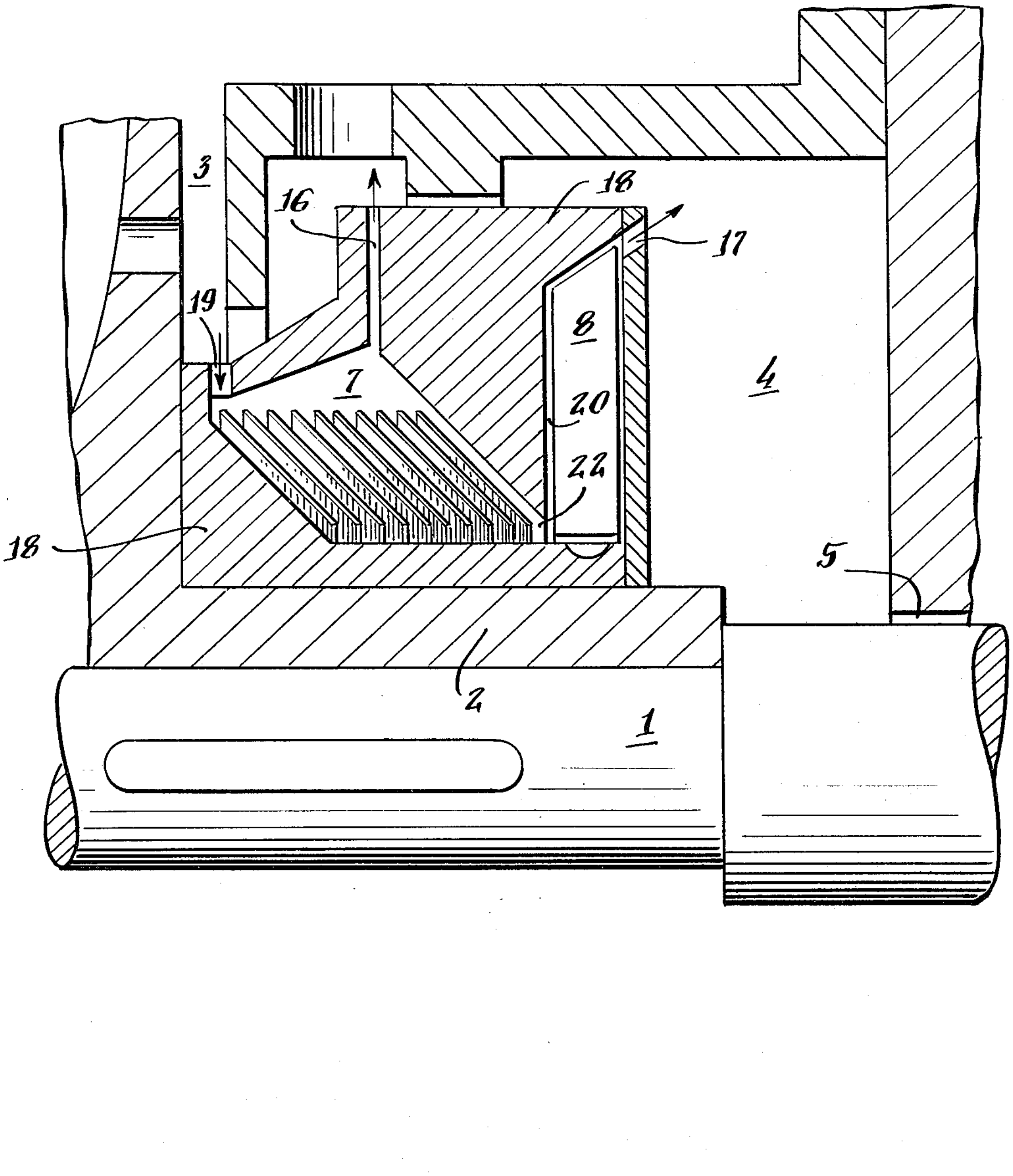
FIG. 2 is a similar fragmentary axial sectional view of a fluid flow machine which embodies a modified cleaning apparatus.

FIG. 2 illustrates a portion of a slightly modified cleaning or separating apparatus including a housing 18 which rotates with the hub 2 of the pump shaft 1 and has at least one inlet 19 corresponding to the inlet 10 of FIG. 1 but located nearer to the axis of the shaft 1 than the outlets 16 and 17 which respectively correspond to the outlets 11 and 12 of FIG. 1. It will be noted that, in the housing 6 of FIG. 1, the inlet 10 is located at a level between the outlets 11 and 12, as considered in the radial direction of the shaft 1. The positioning of inlet 19 and outlets 17, 18 in a manner as shown in FIG. 2 contributes to circulating action upon the liquid which leaves the space 3 to enter the chamber 7 via inlet 19.

Figure 3:
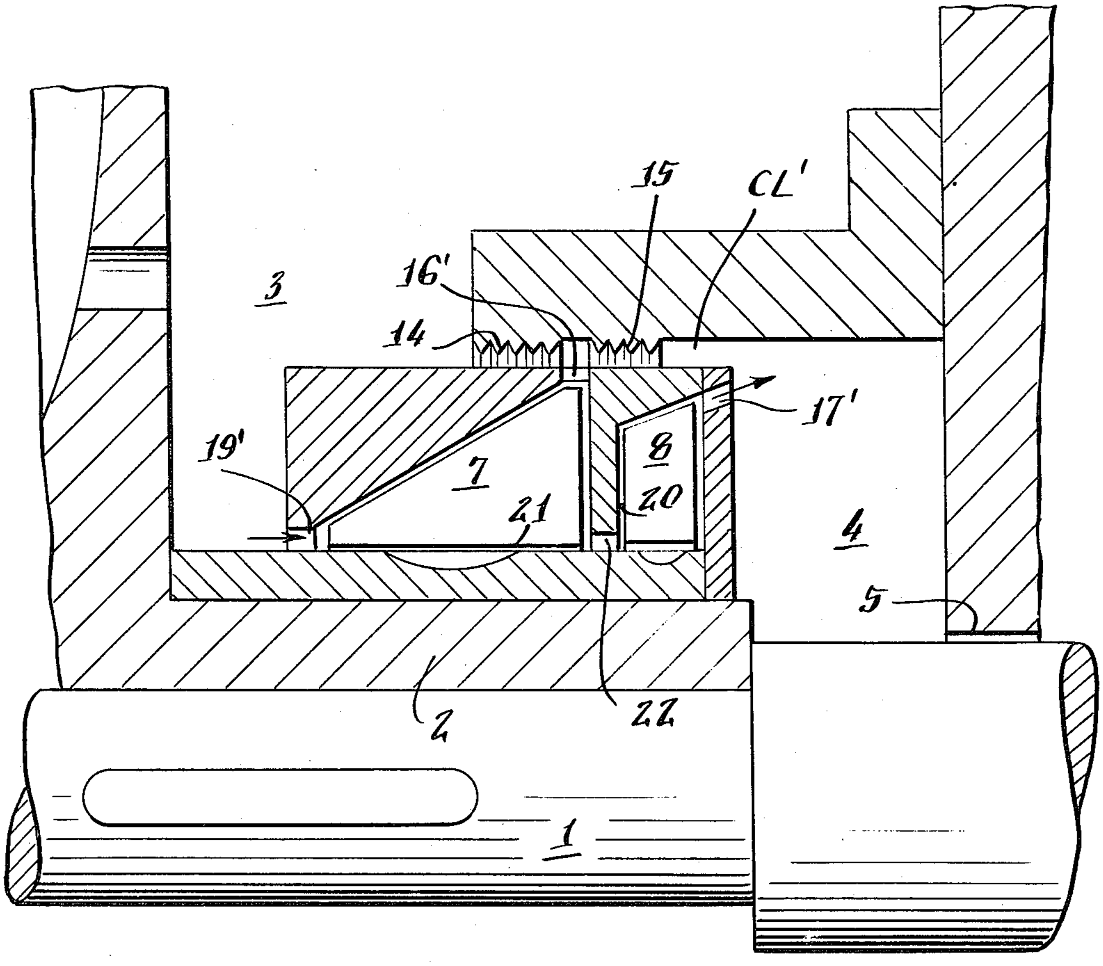
FIG. 3 is a similar fragmentary axial sectional view of a fluid flow machine embodying a third cleaning apparatus.

In the apparatus of FIG. 3, the inlet 19' is located even closer to the axis of the pump shaft 1, and the chamber 7 contains conveyor means in the form of ribs 21 which cooperate with ribs or baffles 20 in the buffer chamber 8 to enhance the circulation of liquid through the chambers 7 and 8 and into the clearance CL'. The outlet 16' is located between the threaded conveyors 14, 15 and the outlet 17' from the buffer chamber 8 is located at a level between the inlet 19' and outlet 16', as considered in the radial direction of the shaft 1. The ribs 20 and 21 of FIG. 3 contribute to liquid circulating action of the threaded conveyors 14 and 15.

Figure 4:
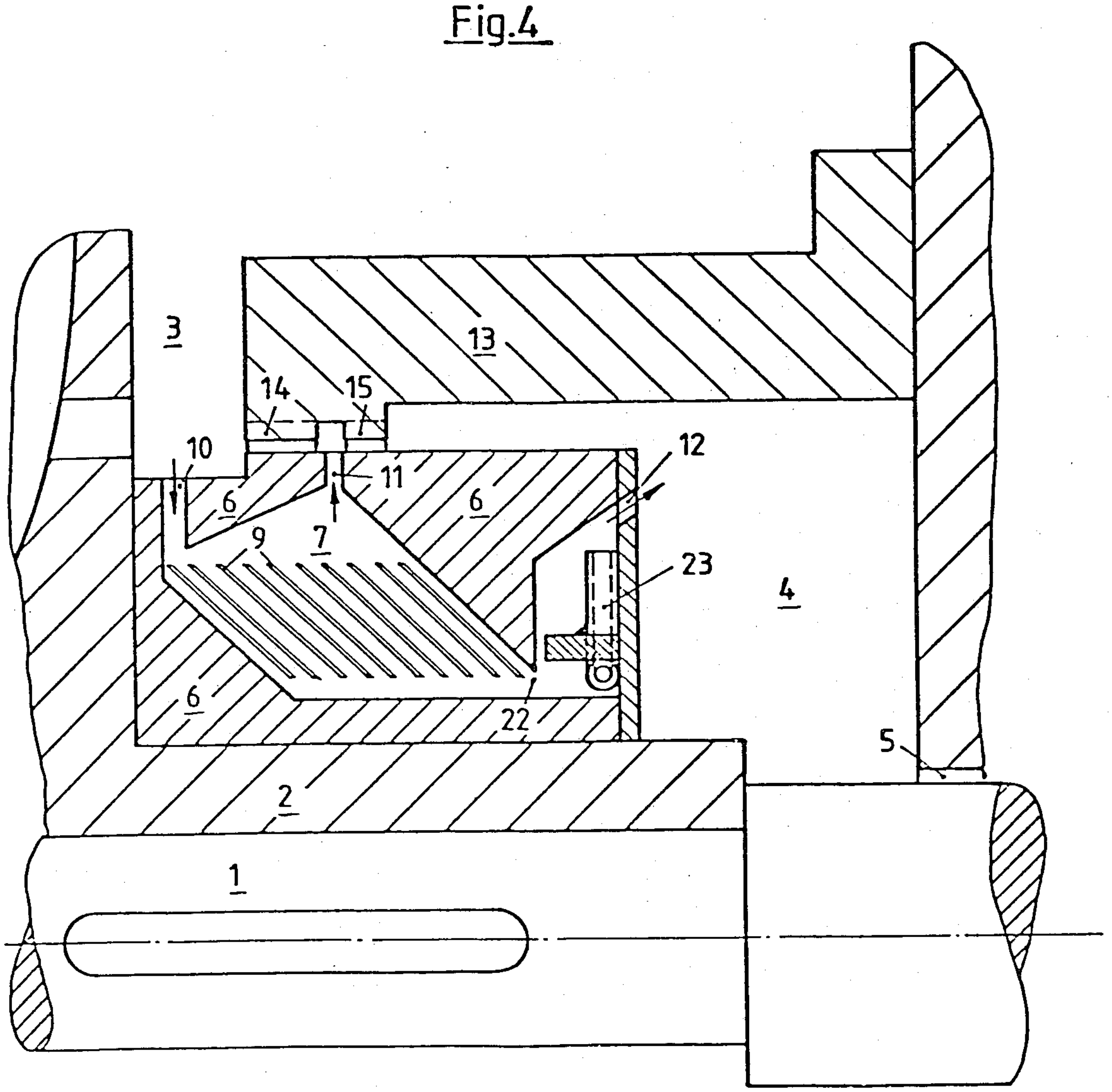
FIG. 4 is a similar but somewhat more schematic fragmentary axial sectional view of a further fluid flow machine.
Figure 5:
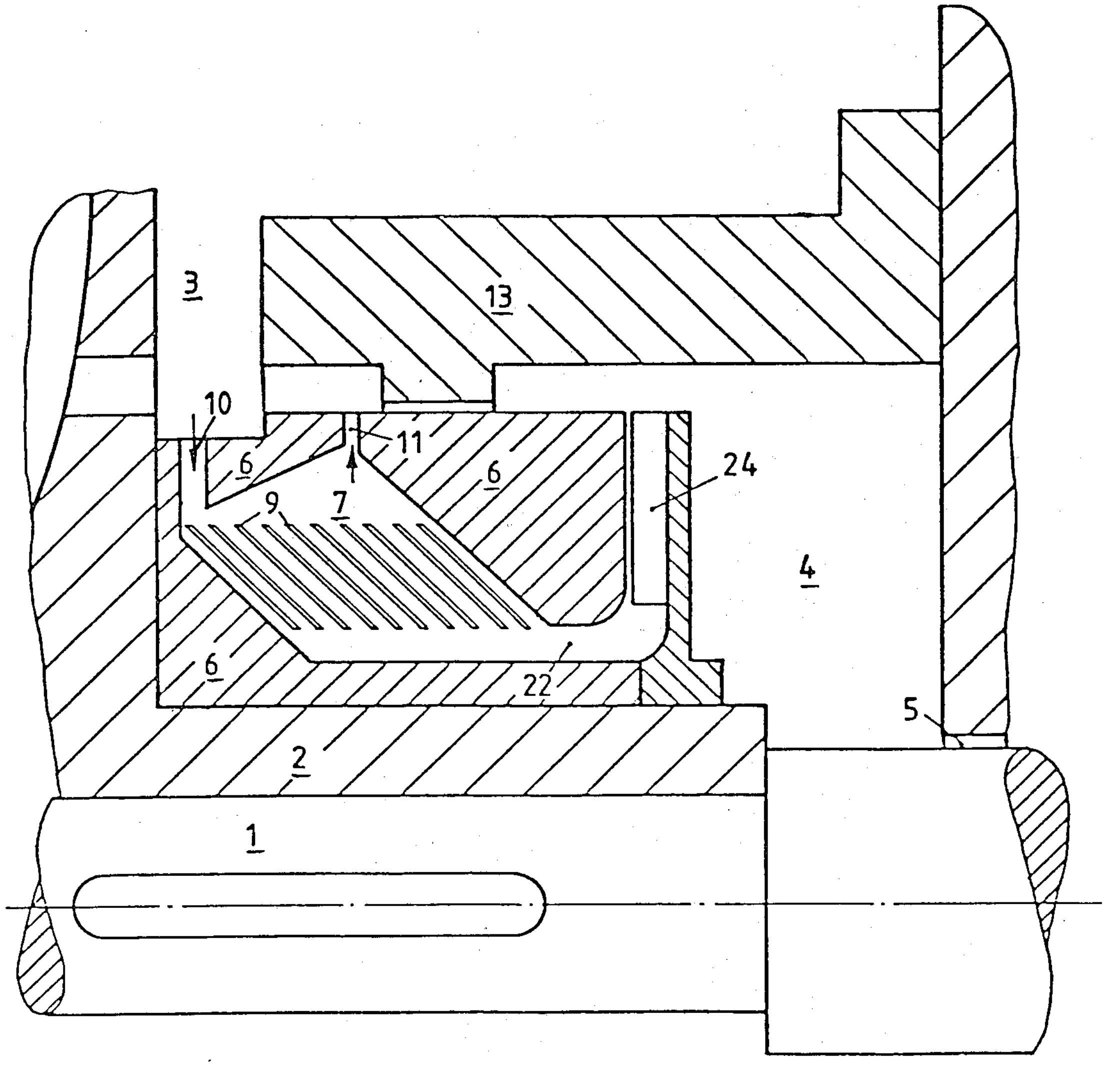
FIG. 5 is a similar schematic fragmentary axial sectional view of an additional fluid flow machine.

If desired, the liquid circulating action can be enhanced by the provision of one or more scoops, e.g., of the type used in certain hydrodynamic torque converters (note the scoop 23 in FIG. 4), by the provision of one or more auxiliary impellers (note the impeller 24 in FIG. 5) receiving torque from the pump shaft 1 and/or by the provision or other types of circulation enhancing means. Furthermore, the buffer chamber 8 can constitute a portion of the space 4, i.e., the outlet 12, 17 or 17' can be replaced by an opening which permits practically unimpeded flow of liquid between the buffer chamber and the space immediately upstream of the sensitive part or parts of the fluid flow machine.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. In a fluid flow machine, such as a centrifugal pump, wherein contaminated liquid is conveyed from a first space toward a second space and the contaminants are to be removed upstream of the second space, a cleaning apparatus comprising a housing disposed between the first and second spaces and having inlet means for admission of contaminated liquid from the first space, first chamber means communicating with said inlet means, second chamber means communicating with said first chamber means, first outlet means connecting said second chamber means with the second space and second outlet means connecting said first chamber means with the first space; and means for rotating said housing, said second outlet means being positioned to discharge into the first space contaminants which are separated from the liquid entering said first chamber means by way of said inlet means and migrate toward said second outlet means as the liquid in said first chamber means is set in rotary motion.

2. The apparatus of claim 1, wherein said housing has channel means connecting said first and second chamber means so as to allow cleaned liquid to flow from said first into said second chamber means.

3. The apparatus of claim 2 for use in a fluid flow machine wherein the liquid exhibits the tendency to flow from the first space into said first chamber means when the machine is in operation, and further comprising means defining with said housing a path for the flow of some cleaned liquid from the second space into the first space.

4. The apparatus of claim 3, further comprising conveyor means for effecting circulation of liquid from at least one of said chamber means into the first space.

5. The apparatus of claim 3, further comprising means for subdividing the interior of said first chamber means into a plurality of passages extending from said inlet means toward said channel means for the flow of cleaned liquid into said second chamber means.

6. The apparatus of claim 5, wherein said subdividing means includes a plurality of dished annular inserts, said inlet means being located radially outwardly of said channel means so that the liquid which enters said first chamber means and flows into said second chamber means flows toward the axis of rotation of said housing.

7. The apparatus of claim 3, further comprising conveyor means for circulating the liquid in directions from said first chamber means into the first space and from the second space into the first space.

8. The apparatus of claim 7, wherein said conveyor means comprises ribs in at least one of said chamber means.

9. The apparatus of claim 7, wherein said conveyor means comprises discs provided in said one chamber and protuberances on said discs.

10. The apparatus of claim 3, wherein said path defining means is stationary and further comprising conveyor means provided in said path to effect circulation of liquid from the second into the first space as well as from the second outlet means into the first space.

11. The apparatus of claim 10, wherein said conveyor means comprises at least one set of threads.

12. The apparatus of claim 3, wherein said inlet means is nearer to the axis of rotation of said housing than at least one of said outlet means.

13. The apparatus of claim 3, further comprising conveyor means for circulating the liquid from said first chamber means and from the second space into the first space, said conveyor means comprising at least one scoop.

14. The apparatus of claim 3, further comprising conveyor means for circulating the liquid from said first chamber means and from the second space into the first space, said conveyor means comprising impeller means.

15. The apparatus of claim 3, wherein said second chamber means comprises a buffer chamber containing a supply of cleaned liquid and forming part of the second space.

* * * * *